United States Patent [19]
Babb et al.

[11] Patent Number: 5,261,301
[45] Date of Patent: Nov. 16, 1993

[54] PIPE CUTTING MACHINE

[75] Inventors: Larry F. Babb, LaGrange; Michael P. Gallagher, Brunswick, both of Ohio

[73] Assignee: Emerson Electric Co., St. Louis, Mo.

[21] Appl. No.: 950,392

[22] Filed: Sep. 24, 1992

[51] Int. Cl.$^5$ .................. B23B 5/14; B23B 21/00; B23B 27/08
[52] U.S. Cl. ............................. 82/86; 82/78; 82/70.1
[58] Field of Search .............. 82/70.1, 71, 78, 80, 82/83, 86, 87, 101, 113

[56] References Cited

U.S. PATENT DOCUMENTS

| | | | |
|---|---|---|---|
| 1,801,038 | 4/1931 | Ewing | 82/86 |
| 2,410,355 | 10/1946 | Nesbitt et al. | 82/80 |
| 2,553,147 | 5/1951 | Roescheise | 82/86 |
| 3,216,295 | 11/1965 | Gill | 82/82 |
| 3,217,524 | 11/1965 | Stanley | 72/150 |
| 3,605,530 | 9/1971 | Doty | 82/113 |
| 4,072,073 | 2/1978 | Birkestrand | 82/70.1 |
| 4,209,274 | 7/1980 | Martin et al. | 408/126 |
| 4,412,401 | 11/1983 | Fundell | 82/113 |
| 4,511,826 | 4/1985 | Kouchi et al. | 318/98 |
| 4,777,723 | 10/1988 | Southoff | 30/97 |
| 4,827,816 | 5/1989 | Takaniemi | 82/70.1 |
| 4,953,292 | 9/1990 | Tobey | 30/97 |
| 5,027,681 | 7/1991 | Hyvarinen | 82/101 |
| 5,148,587 | 9/1992 | Phelps et al. | 82/113 |

FOREIGN PATENT DOCUMENTS 912491  3/1982  U.S.S.R. .................. 82/86

OTHER PUBLICATIONS

"High Speed Rotary Pipe & Tube Cutoff Machine" by Continental Machine Company, catalog undated.

*Primary Examiner*—William E. Terrell
*Attorney, Agent, or Firm*—Body, Vickers & Daniels

[57] ABSTRACT

A portable pipe cutting machine comprises a frame, an arm having opposite ends and supported on the frame for pivotal movement about a pivot axis between the opposite ends, a cutting wheel rotatably mounted on one of the ends of the arm, and a hydraulic piston and cylinder unit between the frame and the other end of the arm for pivoting the arm to displace the cutting wheel toward a pipe to be cut which is supported on rollers mounted on the frame beneath the cutting wheel. A manually operable variable displacement pump delivers fluid under pressure to the piston and cylinder unit to displace the arm toward the pipe, and an electric drive motor unit is supported on the arm for displacement therewith and includes an output end axially slidably interengaged with a drive shaft for the cutting wheel.

34 Claims, 6 Drawing Sheets

PIPE CUTTING MACHINE

BACKGROUND OF THE INVENTION

The present invention relates to the art of motor driven pipe cutting machines and, more particularly, to a portable, floor or bench supported pipe cutting machine in which the cutting action is manually controlled by the operator.

Motor driven pipe cutting machines of the character to which the present invention is directed are known and generally include a base or frame structure having rollers which support a pipe to be cut and a motor driven cutting wheel mounted on the frame for displacement into engagement with the pipe to cut the same. One such machine is shown, for example, in U.S. Pat. No. 2,553,147 to Roescheise wherein the cutting wheel is mounted on a pivotal lever which is displaceable toward a pipe to be cut by a hydraulic piston and cylinder unit through a motorized pump mounted on the machine frame. The pump is driven by an electric motor mounted on the frame and through a belt and pulley arrangement, and the cutting wheel is driven by the same electric motor and through a gear train having an input common with the pump drive. A pedal operated valve controls the flow of hydraulic fluid into the piston and cylinder unit to displace the cutting wheel into engagement with a pipe to be cut. When the foot pedal is released, the fluid circuit to the piston and cylinder unit is opened, the cutting wheel is spring biased away from the pipe and, unless the motor is turned off, the cutting wheel continues to rotate and the pump circulates hydraulic fluid in a bypass mode.

Use in the field of motor driven pipe cutters heretofore available is difficult as a result of the structural complexity and unitary construction of the pipe cutters. More particularly in this respect, the pipe cutter has to be transported to the point of use, such as in a truck, and then removed from the truck and setup on the ground or other underlying support surface for operation. The size and weight of the pipe cutter can make the loading and unloading thereof relative to the transport vehicle physically difficult for the workmen and require the use of special loading and unloading elevators or hoists as well as wheeled dollies or the like to facilitate ground transportation of the pipe cutter to the specific point of use. Other disadvantages of motor driven pipe cutters heretofore available, whether for use in the field or otherwise, include the limited ability of the operator to control the cutting force and thus the speed at which a pipe of given diameter can be cut. In the machine of Roescheise, for example, the operator only controls actuation of the pump and not the displacement thereof and, therefore, has no control of the cutting force or speed. In some pipe cutters, displacement of the cutting wheel is achieved by a hand operated lever which affords control of the cutting force by the operator, but such hand operation is physically fatiguing, whereby optimum force and cutting speed is likely to progressively decrease in connection with continuous use of the cutter by the operator.

Another disadvantage of prior pipe cutting machines resides in the difficulty in obtaining a quality cut and maintaining quality from one cut to another. In this respect, a quality cut requires that the axis of the pipe be maintained parallel to the axis of the cutting blade so that the cut is in a plane transverse to the pipe axis. Generally, the pipe to be cut is supported on rollers beneath the cutting blade and on an adjustable support spaced from the cutting machine. The latter support is adjusted laterally in an effort to align the pipe and cutting wheel axes, but the desired parallel relationship therebetween is extremely difficult to obtain and/or maintain from one cut to another. Any misalignment with respect to desired parallel relationship between the pipe and cutting wheel axes reduces the quality of the cut obtained, whereby considerable time and effort is spent to initially make the necessary adjustments of the adjustable support to assure as accurate alignment as possible, and frequent checking of the alignment is necessary in an effort to maintain the best possible alignment.

Yet another disadvantage in connection with pipe cutters such as that shown in the patent to Roescheise resides in the fact that there is a limited range of pipe diameters which can be safely cut. In this respect, the pipe is cradled between a pair of rollers which rotatably support the pipe during the pipe cutting operation, and it is important that the point of contact of the cutting wheel with the pipe at the beginning of the cutting operation is as close as possible to a vertical plane parallel to and between the roller axes. This relationship provides for the cutting force against the pipe to be fairly equally distributed between the supporting rollers. As the point of contact moves laterally away from the vertical plane, which occurs when the arm and blade are pivoted upwardly relative to the rollers to accommodate large diameter pipe, the cutting force is applied in a direction more toward one of the rollers than the other. As the diameter of pipe being cut increases such misdirection of force from the vertical plane progressively increases and this disadvantageously affects both the application of cutting force and the stability of the support for the pipe being cut, and the latter can result in the workpiece being displaced from the rollers by the rotating cutting wheel. In particular in this respect, it will be appreciated that as the pipe diameter increases the points of contact thereof with the rollers moves upwardly toward a plane tangential to the uppermost surfaces of the rollers, thus progressively decreasing the ability of the rollers to support the pipe against lateral displacement from its cradled position.

SUMMARY OF THE INVENTION

In accordance with the present invention, an improved motor driven, portable cutting machine is provided by which the foregoing and other problems and disadvantages of motor driven pipe cutters heretofore provided are minimized or overcome. More particularly, a pipe cutting machine according to the present invention basically comprises a frame, a pivotal arm supporting a rotatable cutting wheel, rollers mounted on the frame and underlying the cutting wheel, a piston and cylinder unit for pivoting the arm to displace the cutting wheel toward a pipe supported on the rollers, a separable drive unit for rotating the cutting wheel, and a manually operable pump for delivering fluid under pressure to the piston and cylinder unit.

In accordance with one aspect of the invention, the pump is a manually operable variable displacement pump which enables the operator to control the cutting force applied by the cutting wheel against a pipe being cut and, thus, the speed with which a cut can be made. In accordance with another aspect of the invention, the pivotal lever is vertically adjustable on the frame so as to accommodate the cutting of a wide range of pipe diameters while maintaining the desired relationship with respect to the direction of cutting force relative to the underlying support rollers.

In accordance with yet another aspect of the invention, the drive unit includes an electric motor having an axis of rotation and a driven output coupling having an axis of rotation transverse to that of the motor. The cutting wheel has a drivable stub shaft adapted to slidably receive the output coupling of the drive unit, and the latter is axially slidably displaceable from the frame and arm assembly and, when assembled therewith, is supported by the arm for pivotal displacement therewith. This drive unit arrangement promotes compactness of the pipe cutting machine and the ease of use thereof. Further, the ability to slidably engage and disengage the drive unit with the arm and cutting wheel shaft facilitates separation of the drive unit and arm assembly to promote portability and ease of handling in this respect, and to promote ease of assembly when the machine is to be used. Particularly in this respect, the frame and arm assembly weighs only about 100 lbs. and, preferably, is provided with handles to facilitate carrying the latter. The drive unit in the preferred embodiment weighs about 31 lbs. and is provided with a handle to facilitate the carrying thereof. Preferably, the manually operable pump is connected to the inlet of the piston and cylinder unit by a quick disconnect coupling, whereby the pump is adapted to be readily connected to and disconnected from the piston's cylinder unit which is attached to the frame and arm assembly to further promote portability, disassembly for the latter purpose and reassembly for use.

In accordance with a further aspect of the invention, the frame and arm assembly is relatively narrow in the direction of the roller and cutting wheel axes and this, together with the lightness in weight of the assembled cutting machine, advantageously provides for the latter to square itself with a pipe being cut, thus to perform a good quality cut in connection with each cutting operation. More particularly in this respect, the cutting machine rests on an underlying surface such as a floor or bench and a pipe to be cut is positioned on the supporting rollers and an adjustable support in the usual manner. The rotating cutting wheel is then displaced into engagement with the pipe and any misalignment between the pipe and cutting wheel axes will result in the cutting machine tilting relative to the underlying support surface so as to square itself with the pipe, whereby the pipe is cut in a plane transverse to the axis thereof. This capability advantageously minimizes the time and effort heretofore required to try to obtain accurate alignment between the pipe and cutting wheel axes prior to a cutting operation, as well as the time and effort required to maintain alignment from one cut to the next. Furthermore, the self-squaring capability produces a high quality cut every time the machine is used and thus promotes production efficiency, continuous high quality production and minimal wastage. Moreover, the self-squaring capability reduces the wearing forces imposed on component parts of the cutting machine during operation thereof and, accordingly, promotes longer life thereof and a reduction in maintenance costs.

It is accordingly an outstanding object of the present invention to provide an improved motor driven pipe cutting machine of the character comprising a frame pivotally supporting an arm which is displaceable by a hydraulic piston and cylinder unit to in turn displace a driven cutting wheel on the arm toward a pipe to be cut which is supported on rollers mounted on the frame beneath the cutting wheel.

Another object is the provision of a pipe cutting machine of the foregoing character which is structurally simple, and relatively light in weight, thus promoting portability thereof.

A further object is the provision of the pipe cutting machine of the foregoing character which promotes operator control of the cutting force and thus the speed at which a given pipe can be cut.

Yet another object is the provision of a pipe cutting machine of the foregoing character wherein the drive unit for the cutting wheel is axially slidably interengaged with the cutting wheel and arm to facilitate disassembly of the drive unit from the frame and arm assembly, thus to further promote portability of the cutting machine and the ease of assembly of the drive unit with the frame and arm assembly at the time of use.

Another object is the provision of a pipe cutting machine of the foregoing character wherein the flow of fluid under pressure to the piston and cylinder unit is controlled by a manually operable variable displacement pump which requires minimal effort on the part of the operator to perform a cutting operation while promoting the operator's ability to control the cutting force and the speed at which a given pipe is cut.

Still a further object is the provision of a pipe cutting machine of the foregoing character which can accommodate a wider range of pipe diameters than heretofore possible while maintaining a desired direction of cutting force application to the different diameter pipes during a cutting operation.

Yet another object is the provision of the pipe cutting machine of the foregoing character wherein the pivotal arm is adjustable on the frame so as to obtain a desired relationship between the point of contact between the cutting wheel and a pipe to be cut relative to the underlying support rolls.

Still another object is the provision of a pipe cutting machine of the foregoing character which is adapted to rest on an underlying surface and which upon contact of the cutting wheel with a pipe to be cut is self-squaring relative to the axis of the pipe, thus to promote cutting the pipe in a plane transverse to the axis.

A further another object is the provision of a pipe cutting machine of the foregoing character which is efficient in use and operation, which can cut pipe faster and with greater ease than heretofore possible and with a more consistently high quality cut than heretofore possible.

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
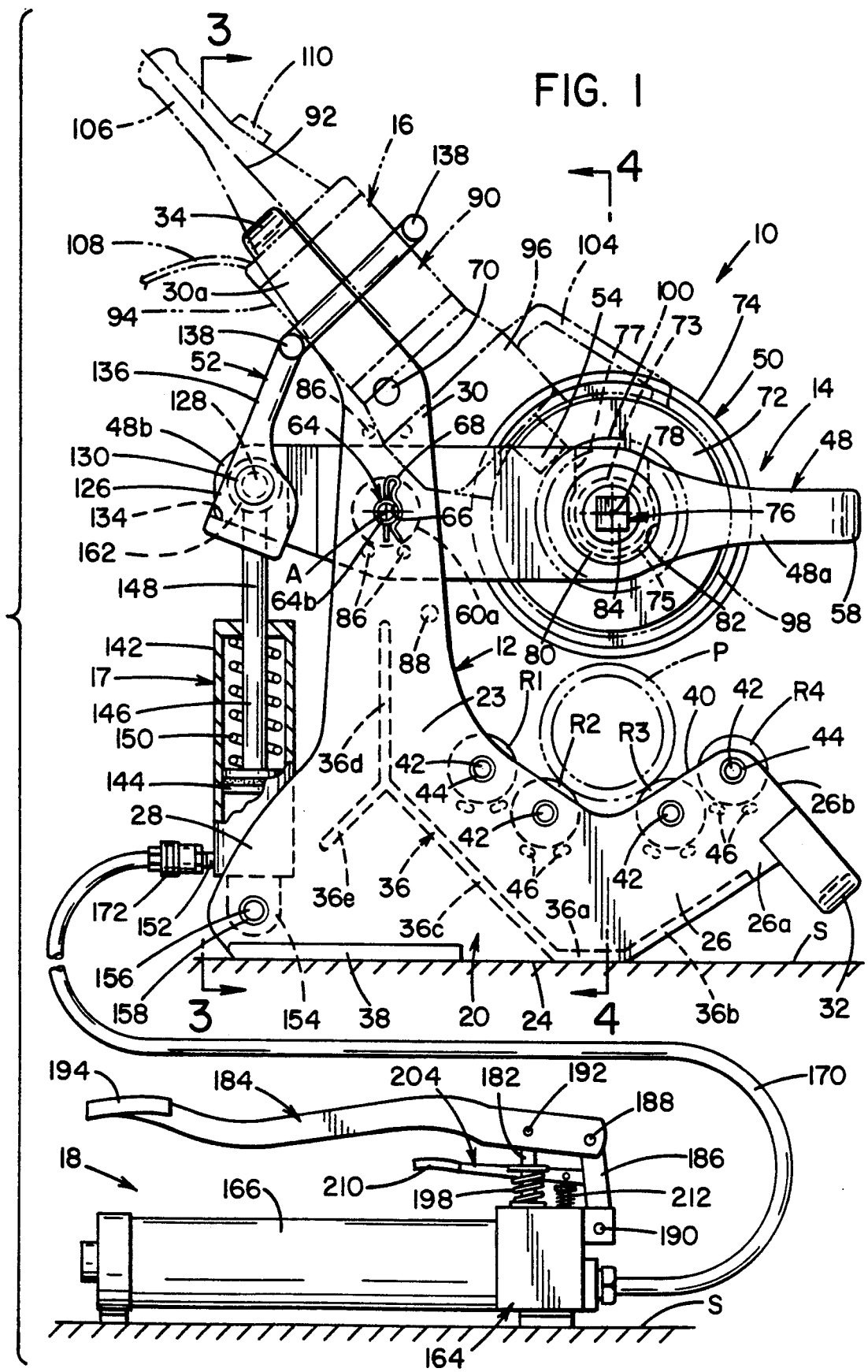
FIG. 1 is a side elevation view, partially in section, of a pipe cutting machine according to the present invention and showing the drive unit therefor in phantom.

Referring now in greater detail to the drawings wherein the showings are for the purpose of illustrating a preferred embodiment of the invention only and not for the purpose of limiting the invention, FIGS. 1-4 illustrate a pipe cutting machine 10 which is basically comprised of a frame 12, a cutting wheel and support arm assembly 14 mounted on frame 12 for pivotal displacement about a pivot axis A, a drive unit 16, and a hydraulic system including a piston and cylinder unit 17 and a variable displacement pump 18 for pivoting arm assembly 14 relative to frame 12 in conjunction with cutting a workpiece as described in greater detail hereinafter.

Frame 12 is preferably a one piece iron casting and comprises a pair of vertical side walls 20 and 22 which are axially spaced apart with respect to the pivot axis A for arm assembly 14. Each of the side walls 20 and 22 has a lower portion 23 including a corresponding bottom edge 24, a front end 26 and a rear end 28, and each of the side walls has an upper portion 30 extending upwardly from lower portion 23. Frame 12 is adapted to rest on an underlying support surface S such as a floor or bench. Front ends 26 of the side walls terminate in inclined portions 26a which extend upwardly and forwardly relative to surface S, and upper ends 30 terminate in inclined portions 30a which extend upwardly and rearwardly relative to surface S. Front portions 26a have outer ends 26b which are laterally interconnected by a generally C-shaped portion 32 which extends downwardly and forwardly from ends 26b and provides a carrying handle. Similarly, upper end portions 30a of the side walls are laterally interconnected by a generally C-shaped portion 34 which provides another carrying handle. Side walls 20 and 22 are also laterally interconnected by an integral web 36 therebetween which includes a portion 36a between bottom edges 24 adjacent front end portions 26, a portion 36b between the lower edges of front end portions 26a,, a portion 36c inclining upwardly and rearwardly from portion 36a toward upper portion 30, a portion 36d extending vertically into upper portion 30, and a portion 36e extending downwardly and rearwardly into rear end 28 from the juncture between portions 36c and 36d. Side walls 20 and 22 further include corresponding laterally outwardly extending support feet 38 which are coplanar with bottom edges 24 and generally underlie upper portions 30 of the side walls.

A plurality of rollers R1, R2, R3 and R4 are mounted between side walls 20 and 22 to rotatably support a pipe P to be cut. Rollers R2 and R3 provide a lower or inner pair of rollers for supporting smaller diameter pipes, and rollers R1 and R4 provide an outer or upper pair of rollers for supporting pipes larger in diameter than can be supported on rollers R2 and R3. More particularly with regard to the mounting of the rollers, front ends 26 of side walls 20 and 22 have corresponding V-shaped upper surfaces 40, and each of the rollers is removably mounted between side walls 20 and 22 by means of a corresponding support shaft 42. Support shafts 42 extend through openings therefor in the side walls and are secured in place with regard to the latter by knurling the ends 42a thereof for engagement in the openings therefor in side wall 22. The opposite ends of shafts 42 have chamfers 44 for the purpose set forth hereinafter. Suitable bearings, not illustrated, are interposed between each of the rollers and the corresponding support shaft to support the rollers for rotation about roller axes which are parallel to axis A and provided by shafts 42. In order to facilitate support of each of the rollers in connection with the mounting and/or removal thereof relative to the frame unit, side walls 20 and 22 are provided with pairs of projections 46 extending laterally inwardly thereof closely beneath the corresponding end of each roller. In connection with mounting a roller between side walls 20 and 22, for example, the roller is supported on underlying projections 46 and chamfered end 44 of shaft 42 is introduced through the opening therefor in side wall 22. The shaft is then pushed toward side wall 20 whereupon the chamfered end enters the opening through the roll and then the opening in side wall 20 to elevate the roller from projections 46. Knurled end 42a then engages with the opening in side wall 22 to secure the shaft in place.

Figure 2:
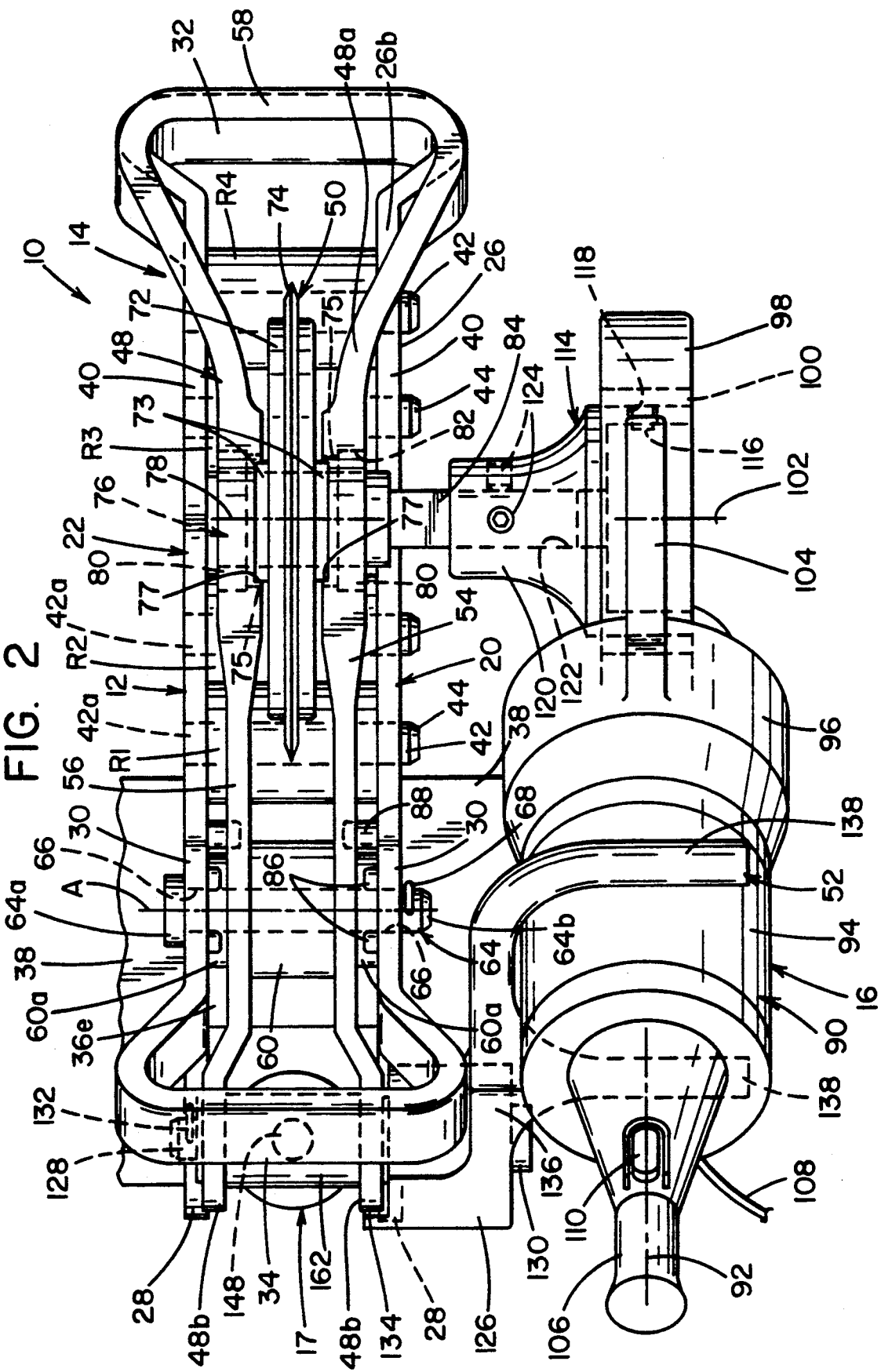
FIG. 2 is a plan view of the machine shown in FIG. 1.
Figure 3:
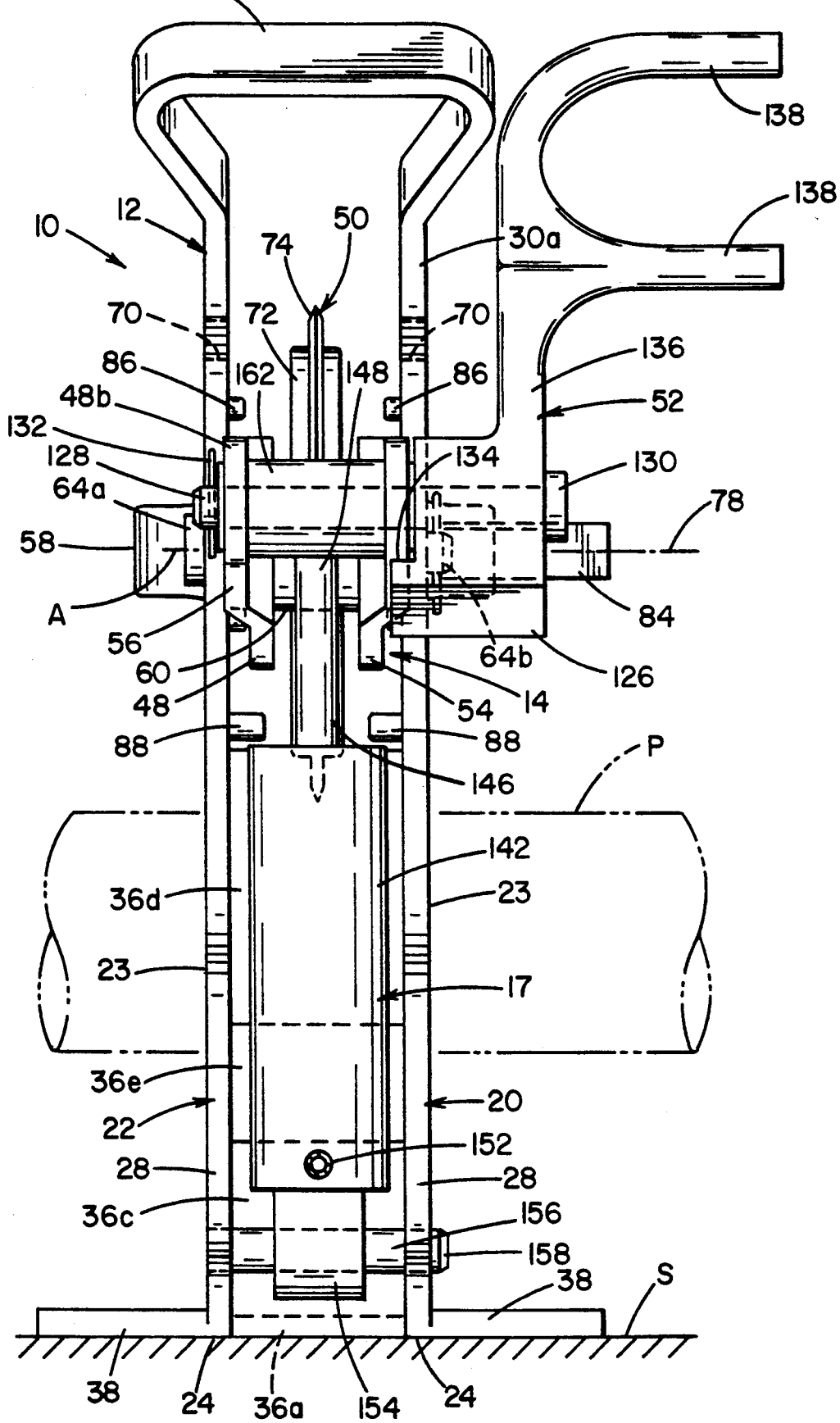
FIG. 3 is a rear elevation view of the frame and arm assembly of the machine, with the drive unit removed, looking in the direction of line 3—3 in FIG. 1.
Figure 4:
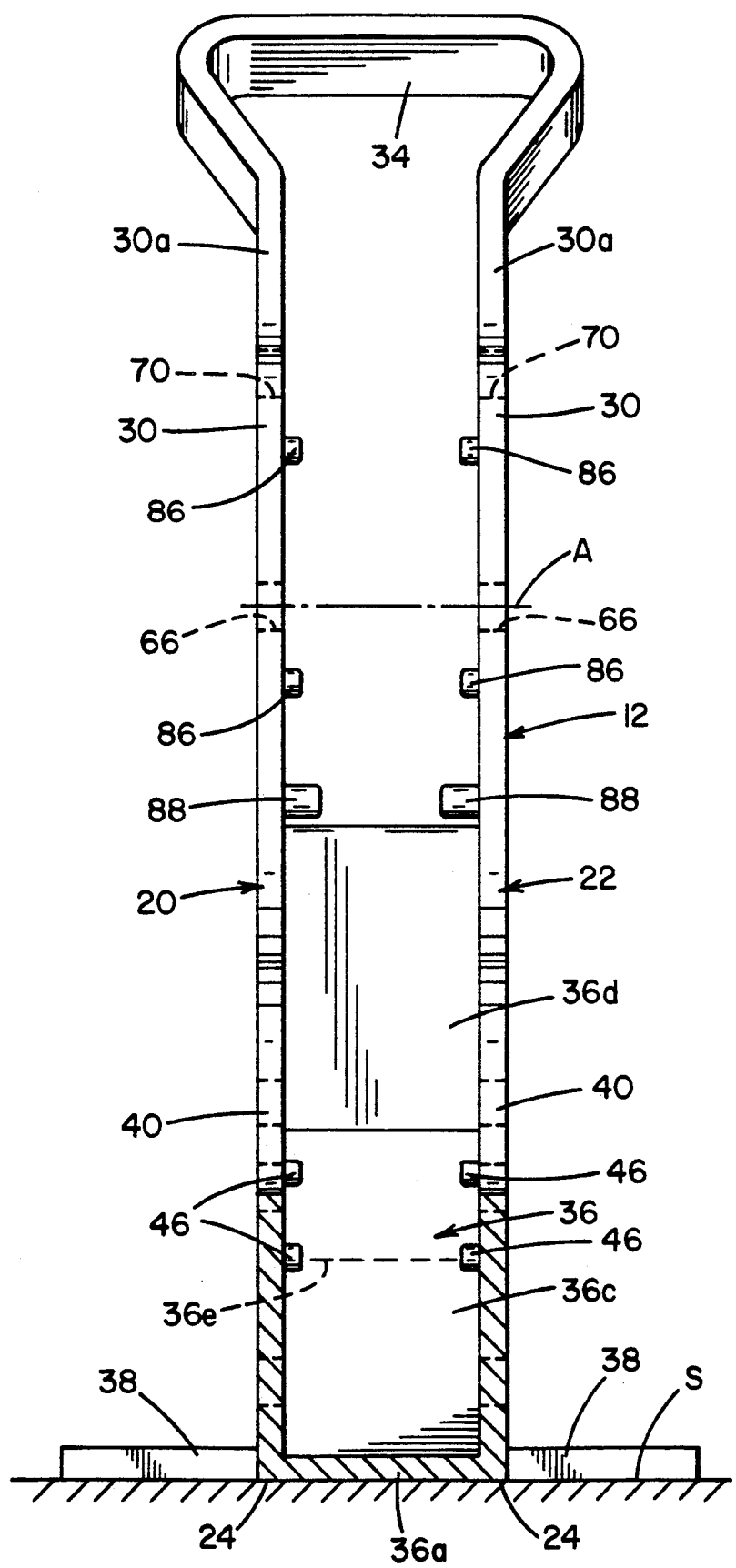
FIG. 4 is a front elevation view, partially in section, of the machine frame.

Arm assembly 14 of cutting machine 10 includes an arm member 48, cutting wheel 50 and a reaction arm 52 which provides support for drive unit 16 as set forth more fully hereinafter. Arm member 48 is preferably a one-piece casting and, as best seen in FIGS. 1 and 2, has an outer end 48a and an inner end 48b, which ends respectively overlie the front and rear ends of frame 12. Further, arm member 48 includes sides 54 and 56 axially spaced apart with respect to pivot axis A and interconnected at outer end 48a of the arm member by a generally C-shaped portion providing a handle 58. Sides 54 and 56 are interconnected inwardly adjacent inner end 48b by a hub component 60 which is bored to receive a pivot pin 64 which provides axis A and pivotally supports the arm assembly on frame 12. More particularly in this respect, upper portion 30 of side walls 20 and 22 of the frame are provided with apertures 66 receiving pin 64, which pin has a head 64a outwardly adjacent side wall 22 and a chamfer 64b of the opposite end outwardly adjacent side wall 20 and receiving a hairpin-clip 68 by which the pin and thus arm assembly 14 is removably mounted on frame 12. The upper ends 30 of side walls 20 and 22 of the frame are also provided with openings 70 spaced above openings 66 and which openings 70 are adapted to receive pin 64, whereby arm assembly 14 can be pivotally mounted on the frame in a selected one of the two vertical locations provided by openings 66 and 70 for the purpose set forth hereinafter.

Cutting wheel 50 includes an annular body portion 72, hub portions 73 and a cutting blade portion 74 extending circumferentially about body portion 72 and extending radially outwardly therefrom. Cutting wheel 50 is mounted on a cutting wheel drive shaft 76 for rotation therewith, and drive shaft 76 extends through hub portions 73 and through enlarged openings 75 in arm sides 54 and 56 and is supported for rotation relative thereto about a cutting wheel axis 78 by means of a pair of bearing units 80 interposed between shaft 76 and recesses 82 provided for the bearing units in the outer surfaces of sides 54 and 56 of the arm member. The end of shaft 76 axially adjacent side 54 of the arm member is provided with a square stub shaft 84 extending axially outwardly of the arm member for coupling with drive unit 16 as set forth more fully hereinafter. While not shown, a suitable lock nut or other arrangement can be used to provide for removability of shaft 76 to facilitate replacement of cutting wheel 50, and the opening through hub portions 73 of the cutting wheel and the corresponding portion of shaft 76 extending therethrough are axially splined or toothed to provide the desired drive coupling therebetween and the relative axial displacement required to withdraw the shaft from the arm member. To further facilitate quick replacement of cutting wheel 50, the inner surfaces of arm sides 54 and 56 are provided with vertical recesses 77 opening into shaft openings 75 and adapted to slidably receive hub portions 73 so as to guide displacement of the cutting wheel into alignment with axis 78 during a replacement operation. Thus, the operator need only position hub portions 73 at the upper ends of the recesses 77 and then lower the wheel into alignment with axis 78, whereupon shaft 76 is introduced through bearings 80 and the cutting wheel to complete the replacement operation.

As mentioned hereinabove, upper portions 30 of side walls 20 and 22 of frame 12 are provided with openings 70 to facilitate selective mounting of arm assembly 14 relative to the latter and openings 66. To facilitate supporting the arm assembly during mounting thereof on frame 12, the inner sides of upper portions 30 of side walls 20 and 22 are provided with pairs of laterally inwardly extending projections 86 beneath each of the openings 66 and 70. Projections 86 are adapted to closely underlie axially outer end portions 60a of hub 60 of arm member 48. Thus, in connection with mounting the arm assembly in the frame relative to openings 66, for example, hub portions 60a engage the underlying projections 86 to support the arm assembly adjacent the pin openings, and chamfered end 64b of pin a64 is introduced through opening 66 in side wall 22 and moved through hub 60 toward side wall 20. In the same manner described above with respect to roller shafts 42, chamfered end 64b then enters the opening 66 in side wall 20 to elevate the arm assembly from projections 86. Further in connection with mounting the arm assembly relative to openings 66, upper portions 30 of frame side walls 20 and 22 are provided with laterally inwardly extending projections 88 which are adapted to be engaged by the lower edges of sides 54 and 56 of arm member 48 to assure against pivotal displacement of the arm assembly clockwise in FIG. 1 to an extent which would bring the cutting wheel into contact with the underlying rollers when the arm assembly is supported on projections 86 during a mounting operation. Stop projections 88 also preclude engagement of the cutting wheel with the rollers during a cutting operation when the arm assembly is mounted on the frame through the use of openings 66. When the arm is mounted on the frame through the use of openings 70, pivotal movement of arm 48 to the extent which would move the cutting wheel into engagement with the rollers is precluded by handle 58 on outer end of arm 48 engaging the front end of the frame or roller R4.

Cutting wheel 50 is adapted to be rotated about axis 78 by drive unit 16 which is removably supported on arm 48 as described hereinafter for pivotal displacement therewith about axis A. Drive units of the character represented by numeral 16 are well known in the pipe threading industry and, in the embodiment herein disclosed, the drive unit is a commercially available power drive sold by the Ridge Tool Company of Elyria, Ohio under the latter's product designation No. 700 Power Drive. The structure and operation of such drive units is well known and need not be described in detail herein.

Figure 5:
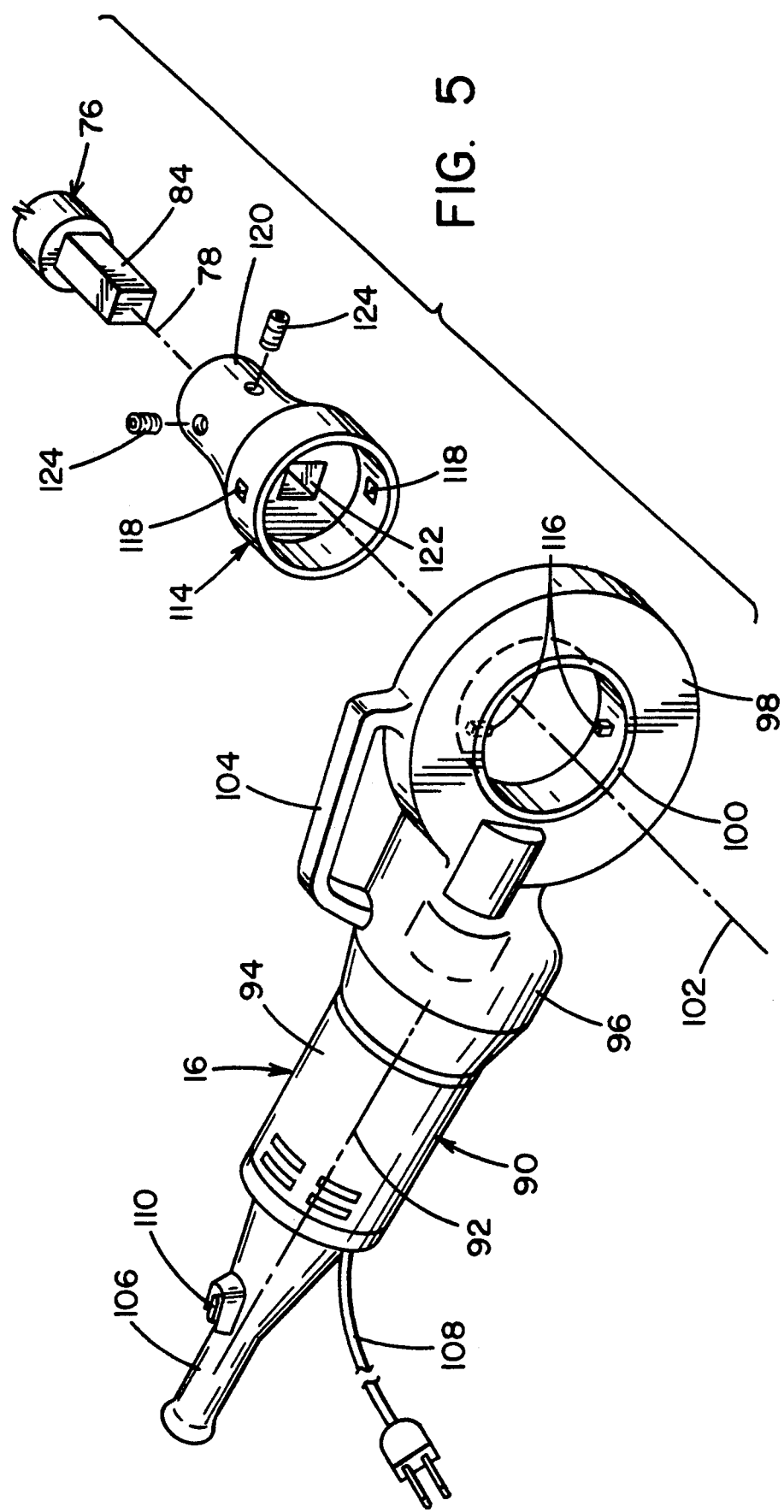
FIG. 5 is an exploded perspective view of the drive unit, cutting blade stub shaft and drive coupling.

Briefly, with reference to FIG. 5 and in connection with the use of the drive unit in accordance with the present invention, the drive unit includes an elongate housing 90 having an axis 92 and including a portion 94 enclosing an electric motor, not shown, having an axis parallel to axis 92, a housing portion 96 enclosing a gear reduction unit, not shown, and a housing portion 98 enclosing a drive ring 100 having an axis 102 transverse to axis 92. As is further well known, drive ring 100 is peripherally toothed so as to be rotated about axis 102 by an appropriate gear on the output end of the gear reduction unit. The drive unit housing further includes a handle 104 between housing portions 96 and 98, and a handle portion 106 extending rearwardly from housing portion 94. A power cord 108 facilitates connecting the drive unit to a source of electricity, and a three position switch 110 provides for operating the electric motor in opposite directions.

As is still further well known, drive ring 100 is adapted to releasably receive and rotatably drive a tool component such as the square drive adaptor 114 by which the drive unit is drivingly coupled with stub shaft 84 of cutting wheel 50 in connection with the present invention. More particularly in this respect, drive ring 100 is provided with a pair of opposed radially inwardly projecting spring loaded adaptor pawls 116, and the outer surface of adaptor 114 is provided with a pair of opposed pawl recesses 118. Adaptor 114, which is commercially available from the Ridge Tool Company, includes an output sleeve 120 having a square opening 122 therethrough which is adapted to receive stub shaft 84, and sleeve 120 is provided with a pair of set screws 124 for releasably securing the adaptor to the stub shaft. Preferably, for purposes of convenience, adaptor 114 is secured to stub shaft 84 and drive unit 16 is disengaged from the adaptor to separate the drive unit from the frame and arm assembly of the pipe cutting machine.

When the drive unit is mounted on the frame and arm assembly, as shown in FIG. 2, the end of housing portion 94 adjacent handle 106 is supported by reaction arm 52 mounted on end 48b of arm 48. More particularly in this respect, reaction arm 52 includes a body portion 126 mounted on inner end 48b of side 54 of arm member 48 by means of a pin 128 extending through an opening therefor in body portion 126 and openings through inner end portions 48b of arm sides 54 and 56. Pin 128 has a headed end 130 engaging the outer side of body portion 126 and is removably interengaged with arm 48 by means of a hair pin clip 132 interconnected with the opposite end of the pin axially outwardly adjacent inner end 48b of side 56 of the arm. The axially inner side of body portion 126 of the reaction arm is recessed to provide a shoulder 134 underlying and engaging the bottom edge of inner end 48b of side 54 so as to preclude pivotal displacement of the reaction arm about the axis of pin 128. The reaction arm further includes a post 136 extending upwardly from body portion 126 and having laterally outwardly extending fingers 138 providing a laterally outwardly open U-shaped recess receiving the housing of drive unit 16. It will be appreciated from FIG. 1 that fingers 138 preclude rotation of drive unit 16 in opposite directions about cutting wheel axis 78 and, at the same time, facilitate axial coupling and decoupling displacement of the drive unit relative to the frame and arm assembly.

Arm assembly 14 is adapted to be pivoted in opposite directions about axis A by means of a hydraulic system including piston and cylinder unit 17 and hydraulic pump unit 18. Piston and cylinder unit 17 includes a cylinder member 142 axially slidably receiving a piston 144 having a piston rod 146 extending upwardly therefrom and having an upper or outer end 148 secured to arm 48 as described hereinafter. A coil spring 150 biases piston 144 downwardly in cylinder 142, and the piston is adapted to be displaced upwardly in cylinder 142 by hydraulic fluid under pressure entering the cylinder beneath the piston through an inlet line 152. The lower end of cylinder 142 is provided with a mounting block 154 by which the lower end of the cylinder is pivotally attached to rear ends 28 of side walls 20 and 22 of the frame by means of a pin 156. Pin 156 extends through openings therefor in walls 20 and 22 and mounting block 154, and chamfered end 158 facilitates introducing the pin through the openings. The pin is removably retained in place on the frame by knurling the end portion of the pin received in the opening therefor in frame wall 20. Outer end 148 of piston rod 146 is secured to a mounting sleeve 162 which extends between inner ends 48b of arm sides 54 and 56 and is pivotally secured in place therebetween by means of pin 128 by which reaction arm 52 is mounted on arm 48.

As will be appreciated from FIG. 1, fluid under pressure introduced into cylinder 142 beneath piston 144 displaces the latter upwardly to in turn pivot arm 48 and thus cutting wheel 50 clockwise about axis A toward pipe P supported on rollers R2 and R3 therebeneath. When drive unit 16 is energized to rotate cutting wheel 50, such displacement of arm 48 results in blade portion 74 of the cutting wheel engaging and rotating pipe P to achieve cutting thereof. Upon the release of hydraulic fluid under pressure from behind piston 144, as described more fully hereinafter, spring 150 biases piston 144 downwardly in cylinder 142, thus to pivot arm 48 and thus cutting wheel 50 counterclockwise about axis A and upwardly from the cut pipe.

Figure 6:
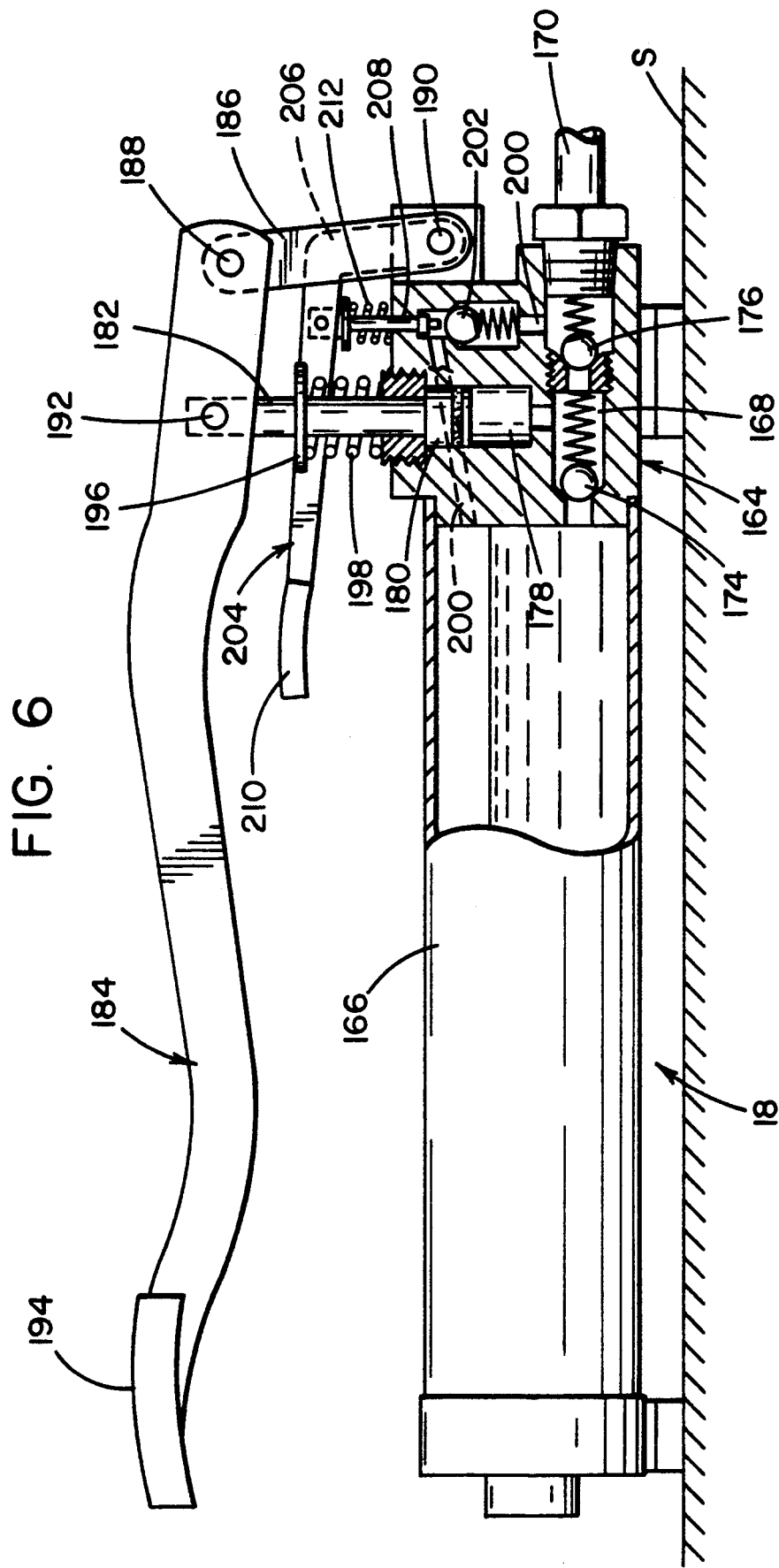
FIG. 6 is a side elevation view, partially in section, of the variable displacement pump for the machines.

In accordance with the present invention, the flow of hydraulic fluid to and from piston and cylinder unit 17 is manually controlled by the machine operator through hydraulic pump 18 which, in the embodiment disclosed, is foot pedal operated. However, it is to be understood that the term manually as used in connection with the pump is intended to include either foot or hand operation. Pump 18 in accordance with the present invention is a variable displacement pump. It is to be noted at this point that a manually operable variable displacement pump, as the latter terminology is used herein, is intended to mean that the pump is manually controllable by the operator to vary the fluid displacement thereof during a pipe cutting operation, whereby the operator has control over the cutting force applied to a pipe being cut and thus the speed of the cut. Pump 18, which is illustrated in FIG. 6 of the drawing, is representative of one such pump for the latter purpose. In this respect, pump 18 includes a valve body portion 164 and a tubular reservoir 166 for the hydraulic fluid to be pumped. Body 164 includes an outlet flow passageway 168 between reservoir 166 and a flexible hose 170 by which the pump is connected to piston and cylinder unit 17 through a quick connect coupling 172 as shown in FIG. 1. Passageway 168 is provided with pump intake and discharge check valves 174 and 176, respectively, which control the flow of hydraulic fluid into passageway 168 from reservoir 166 and the flow of hydraulic fluid from passageway 168 to hose 170. More particularly in this respect, passageway 168 is in communication with a piston chamber 178 which receives a vertically reciprocable piston 180 having a piston rod 182 extending upwardly from body portion 164. Piston 180 is adapted to be displaced downwardly in chamber 178 by means of a foot pedal lever 184 having a front end pivotally supported relative to body portion 164 by means of a link 186 connected to the corresponding end of the lever by a pin 188 and to body portion 164 by a pin 190. Lever 184 is pivotally connected to the outer end of piston rod 182 by means of a pin 192, and the opposite end of the lever is provided with a foot treadle 194 or the like by which the lever is adapted to be depressed to pivot about pin 188 so as to displace piston 180 downwardly in chamber 178. The upper end of piston rod 182 is provided with a collar 196, and a biasing spring 198 is interposed between collar 196 and body portion 164 to bias piston 180 to its upper most position.

A return flow passageway 200 interconnects the downstream end of passageway 168 with reservoir 166 and is normally closed by a spring biased ball valve 202. A second foot pedal lever 204 is adapted to displace ball valve 202 downwardly to open passageway 200 to provide for the flow of fluid from line 170 back to reservoir 166 as described more fully hereinafter. More particularly, front end portion 206 of lever 204 extends downwardly and is pivotally interconnected with body portion 164 by means of pin 190, and a ball valve actuating rod 208 is interposed between lever portion 206 and ball valve 202, whereby counterclockwise displacement of lever 204 about pin 190 by depressing treadle portion 210 of the lever displaces ball 202 downwardly away from its seat. A biasing spring 212 is interposed between lever portion 206 and body portion 164 and serves to bias lever 204 clockwise in FIG. 6 to its normal, undepressed position in which valve 202 is closed.

In the preferred embodiment described hereinabove, frame 12 is about 3.8 inches wide between the outer sides of side walls 20 and 22 and about 10 inches wide from the laterally outer ends of feet 38. The frame is about 22.4 inches high and about 20 inches long from the front to the back ends thereof. The frame and arm assembly, with drive unit 16 removed, weighs about 100 pounds, and drive unit 16 weighs about 31 pounds and is about 30 inches long. The pipe cutter, with arm 48 mounted on the frame as shown in FIG. 1, is adapted to cut pipe ranging from 2½ to 4 inches in diameter and, with arm 48 mounted on the frame through the use of openings 70, pipe ranging in diameter from 6 to 8 inches can be cut. In use, drive unit 16 is preferably axially slidably detached from the frame and arm assembly, pump 18 is disconnected through manipulation of quick disconnect coupling 172, and these three components are then adapted to be readily carried from one point to another by a workman or workmen. In particular, the frame and arm assembly is adapted to b carried through the use of handles 32 and 34. At a point of use, for example, drive unit 16 is axially slidably coupled with cutting wheel shaft 76 and reaction arm 52, pump 18 is attached through the use of coupling 172, and power cord 108 of drive unit 16 is plugged into a source of electricity, whereupon the pipe cutter is ready for operation. Further in connection with portability and/or maintenance of the pipe cutter, the mounting of arm 48, reaction arm 52 and piston and cylinder unit 17 through the use of pin and hairpin type retaining members advantageously provides for readily disassembling these component parts relative to one another and to the frame unit. Such disassembly capability facilitates maintenance and/or replacement operations and, if desired, further breakdown of the component parts of the machine to facilitate the handling thereof by an operator with respect to transporting the cutting machine.

In operation of the embodiment herein illustrated and described, a pipe to be cut is supported on rollers R2 and R3 beneath cutting wheel 50, and the outer end of the pipe is suitably supported so that the pipe and cutting wheel axes are generally parallel. Accuracy with respect to alignment of the pipe and cutting wheel axes is not critical, whereby considerable time does not have to be spent attempting to achieve such alignment. When the pipe P is so supported, the operator depresses drive unit switch 110, whereby the drive unit is energized and cutting wheel 50 is rotated, and the operator then repeatedly oscillates pedal lever 184 through the depression and release of foot tread 194 thereof to displace pulses of hydraulic fluid under pressure from reservoir 166 through line 170 into the bottom of cylinder 142, whereupon arm 48 is progressively pivoted clockwise in FIG. 1 about axis A to move blade portion 74 of cutting wheel 50 into engagement with pipe P. Upon engagement between blade portion 74 of the cutting wheel and pipe P, the latter is rotated on rollers R2 and R3, and continued pumping of pedal lever 184 by the operator progressively advances the cutting wheel through the pipe wall to complete the cut. If, upon engagement of blade portion 74 with pipe P, the pipe and cutting wheel axes are not parallel, pipe cutting machine 10 will square itself relative to pipe P to assure that the pipe is accurately cut transverse to the axis thereof. This squaring capability results from the narrowness and the lightness of weight of the pipe cutting machine and assures a high quality cut each time the machine is used. Furthermore, control of the pivotal displacement of arm 48 through the use of variable displacement pump 18 advantageously enables the operator to have a "feel" for the work being done by the drive unit as a result of the cutting force applied to the pipe and, therefore, enables the operator to control the cutting force and thus the speed of cutting. This advantageously enables cuts to be made in the shortest amount of time.

Upon completion of the cut, the operator releases switch 110 to deenergize drive unit 16 and depresses release valve pedal 204 to open return passageway 200, whereupon hydraulic fluid under pressure in cylinder 142 is returned to reservoir 166 of pump 18. Such return flow is provided by biasing spring 150 in the piston and cylinder unit, and it will be appreciated that the latter spring also pivots arm 148 and thus cutting wheel 50 and power unit 16 counterclockwise about axis A to return the components to the open position thereof relative to the pipe supporting rollers. While it is contemplated that cylinder spring 150 has sufficient force to return arm unit 14 to its open position following the cutting of a pipe, a supplemental biasing spring for this purpose could be provided between arm 48 and frame 12. Furthermore, in the event spring 150 does not fully displace arm unit 14 in the open direction, the operator can so displace the arm unit through the use of handle 58 on the outer end of arm 48.

While considerable emphasis has been placed herein on the structures of and the structural interrelationships between the component parts of the preferred embodiment, it will be appreciated that other embodiments of the invention can be made and that changes can be made in the preferred embodiment without departing from the principles of the invention. In this respect, for example, variable displacement pump 18 could be a hand operated pump rather than a foot operated pump, and pump structures other than that illustrated and described herein can be employed. Furthermore, the control switch for drive unit 16 could be incorporated in power cord 108 rather than in the handle of the drive unit. Such a location for the switch would facilitate convenience for the operator's control of the drive unit when the pipe cutting machine is supported on a bench or the like rather than on the ground or other underlying support surface as illustrated herein. Moreover, while drive unit 16 is axially slidably removable from the frame and arm assembly in the embodiment disclosed, it will be appreciated that driving of the cutting wheel can be achieved through the use of a motor mounted on the arm assembly against such ready removability, or by a readily separable drive unit structured other than that disclosed herein. Still further, it will be appreciated that the frame can be structured to support pivotal arm unit 14 at more than the two locations shown in connection with the preferred embodiment. These and other changes will be suggested or obvious from the disclosure of the preferred embodiment herein, whereby it should be distinctly understood that the foregoing descriptive matter is to be interpreted merely as illustrative of the invention and not as a limitation.

Having thus described the invention it is claimed:

1. A pipe cutting machine comprising a frame, roller means on said frame for supporting a pipe to be cut, arm means for supporting a cutting wheel, said arm means having opposite ends, means supporting said arm means on said frame for pivotal movement about a pivot axis between said opposite ends, one of said ends being above said roller means, a cutting wheel mounted on said one end for rotation about a wheel axis parallel to said pivot axis, means to rotate said cutting wheel, hydraulic piston and cylinder means between said frame and the other of said opposite ends of said arm means for pivoting said arm means about said pivot axis to displace said cutting wheel in the direction toward said roller means, a source of hydraulic fluid, and a manually operable variable displacement pump for delivering fluid under pressure to said piston and cylinder means to displace said arm means in said direction, said pump including a fluid chamber having an inlet connected to said source and an outlet connected to said piston and cylinder means, fluid displacement means in said chamber for pumping fluid from said chamber to said piston and cylinder means, and manually operated means for controlling said fluid displacement means to vary the displacement of fluid from said chamber to said piston and cylinder means.

2. A pipe cutter according to claim 1, and means biasing said arm means to pivot about said pivot axis to displace said cutting wheel in the direction away from said roller means.

3. A pipe cutter according to claim 2, wherein said biasing means includes biasing spring means in said piston and cylinder means.

4. A pipe cutter according to claim 1, wherein said means to rotate said cutting wheel includes a drivable shaft supporting said cutting wheel on said arm means for rotation about said wheel axis, and drive motor means including driven output means axially slidably interengaged with said shaft.

5. A pipe cutter according to claim 4, wherein said frame has axially opposite sides with respect to said wheel axis and said shaft includes a driven end extending axially outwardly of one of said opposite sides, said drive motor means including a housing having an axis transverse to said wheel axis and axially opposite ends, said driven output means being adjacent one of said housing ends, and drive motor support means on said arm means and interengaging with said housing at a location spaced from said one end of said housing toward the other of said opposite ends thereof.

6. A pipe cutter according to claim 5, wherein said drive motor support means is adjacent said other end of said arm means.

7. A pipe cutter according to claim 6, wherein said drive motor support means includes a U-shaped support member opening axially outwardly of said one side of said frame.

8. A pipe cutter according to claim 1, wherein said frame includes means for mounting said arm means on said frame for pivotal displacement about a selected one of a plurality of pivot axes vertically spaced apart on said frame.

9. A pipe cutter according to claim 8, and stop means to limit pivotal displacement of said one end of said arm means in said direction toward said roller means when said arm means is mounted for pivotal displacement about at least one of said plurality of pivot axes.

10. A pipe cutter according to claim 1, wherein said arm is removably mounted on said frame means and said frame includes means to vertically support said arm means adjacent said pivot axis during removal and replacement thereof.

11. A pipe cutter according to claim 10, wherein said frame has side walls axially spaced apart with respect to said pivot axis and said arm means is between said side walls and includes a hub coaxial with said pivot axis, said means to vertically support said arm means including means extending axially inwardly from each said side wall beneath said hub.

12. A pipe cutter according to claim 11, wherein said means extending inwardly from said side walls includes a pair of projections on each of said side walls and spaced apart thereon transverse to said pivot axis.

13. A pipe cutter according to claim 1, and stop means to limit pivotal displacement of said one end of said arm means in said direction toward said roller means.

14. A pipe cutter according to claim 13, wherein said frame has side walls axially spaced apart with respect to said pivot axis and said arm means is between said side walls and has axially opposite sides adjacent thereto, and said stop means includes means extending axially inwardly from each of said side walls and underlying the corresponding side of said arm means.

15. A pipe cutter according to claim 1, wherein said roller means are removably mounted on said frame for rotation about roller axes and said frame includes means to vertically support said roller means adjacent said roller axes during removal and replacement thereof.

16. A pipe cutter according to claim 15, wherein said frame has side walls axially spaced apart with respect to said roller axes and said roller means are between and have axially opposite ends adjacent said side walls, said means to vertically support said roller means including means extending axially inwardly from each said side wall beneath the corresponding ends of said roller means.

17. A pipe cutter according to claim 1, wherein said frame includes opposite side walls spaced apart in the direction of said pivot axis, each said side wall having a lower portion including a bottom and front and rear ends and an upper portion extending upwardly from said lower portion and having an upper end, and first and second handles respectively between said front ends and between said upper ends of said side walls.

18. A pipe cutter according to claim 17, wherein said roller means are between said front ends of said side walls and said arm means is between said upper portions of said side walls, said pivot axis being below said upper ends, said first handle being forwardly of said roller means and said second handle being rearwardly of said pivot axis.

19. A pipe cutter according to claim 18, and a handle on said one end of said arm means.

20. A pipe cutter according to claim 18, wherein said bottoms of said side walls are adapted to rest on an underlying support surface, said front ends including inclined portions extending upwardly and forwardly relative to said surface and having outer ends, said upper ends extending upwardly and rearwardly relative to said surface and having outer ends, said first handle extending downwardly from said outer ends of said inclined portions, and said second handle extending between said outer ends of said upper ends.

21. A pipe cutter according to claim 20, and a handle on said one end of said arm means, said handle on said arm means extending forwardly of and axially across said cutting wheel.

22. A pipe cutter according to claim 1, wherein said arm means includes sides axially spaced apart with respect to said wheel axis and having axially opposed inner surfaces, said cutting wheel being between said inner surfaces and having axially opposite sides facing said inner surfaces, means providing shaft receiving openings through said inner surfaces of said side means and through said opposite sides of said cutting wheel, shaft means slidably received in said openings to mount said cutting wheel on said arm means, and guide means between said inner surfaces and said opposite sides for guiding said shaft receiving openings into alignment to receive said shaft means during a cutting wheel mounting operation.

23. A pipe cutter according to claim 22, wherein said sides have upper ends and said guide means includes recesses in said inner surfaces extending downwardly from said upper ends and opening into said shaft receiving openings through said inner surfaces, and hubs on said opposite sides of said cutting wheel and coaxial with said shaft receiving opening through said opposite sides, said hubs being vertically slidably received in said recesses.

24. A pipe cutting machine comprising spaced apart vertical side walls each having a lower portion including a bottom and front rear ends and an upper portion extending upwardly from said lower portion and having an upper end, a plurality of rollers each having a roller axis transverse to said side walls, said rollers being mounted between said front ends of said side walls for supporting a pipe to be cut, cutting wheel supporting arm means between said upper portions of said side walls and mounted thereon for pivotal displacement about a pivot axis transverse to said side walls, said arm means having a first end forwardly of said pivot axis and above said front ends of said side walls and a second end rearwardly of said pivot axis and above said rear ends of said side walls, a cutting wheel on said arm means adjacent said first end thereof and overlying said rollers, means including a drive shaft mounting said cutting wheel on said arm means for rotation about a wheel axis parallel to said pivot axis, said drive shaft including an input end extending axially outwardly of said arm means, a drive motor supported on said arm means for pivotal displacement therewith and having output means in driving interengagement with said input end of said drive shaft, hydraulic piston and cylinder means mounted between said rear ends of said side walls and said second end of said arm means for displacing said arm means about said pivot axis in the direction to displace said cutting wheel toward said rollers, and lever actuated variable displacement piston pump means for delivering hydraulic fluid under pressure to said piston and cylinder means to displace said arm means in said direction.

25. A pipe cutter according to claim 24, wherein said front ends of said side walls have axially inner sides and said rollers are removably mounted on said front portions and extend between said inner sides thereof, and projection means on said inner sides of said front portions and extending inwardly therefrom beneath the corresponding end of each roller to vertically support said rollers during removal and replacement thereof.

26. A pipe cutter according to claim 24, wherein said upper portions of said side walls have axially inner sides and said arm means is removably mounted on said upper portions and extends between said inner sides thereof, and projection means on said inner sides of said upper portions and extending inwardly therefrom beneath the corresponding side of said arm means to vertically support said arm means during removal and replacement thereof.

27. A pipe cutter according to claim 24, wherein said arm means is selectively mountable on said upper portions of said side walls in one of a plurality of vertically spaced locations.

28. A pipe cutter according to claim 24, wherein said drive motor means includes a housing having opposite ends in the direction between said first and second ends of said arm means, said output means being at one of said ends and axially slidably receiving said input end of said drive shaft, and housing support means on said arm means engaging with said housing between said opposite ends thereof to preclude rotation of said housing about said wheel axis.

29. A pipe cutter according to claim 24, and means respectively connecting said front ends and said upper ends of said side walls to provide handles respectively at said front and upper ends.

30. A pipe cutter according to claim 24, wherein said arm means includes arm sides at said first and second ends spaced apart in the direction between said side walls, said cutting wheel being between said arm sides adjacent said first end, said piston and cylinder means including cylinder means mounted between said rear ends of said side walls and piston means including piston rod means having an end between said arm sides at said second end of said arm means.

31. A pipe cutting machine comprising spaced apart vertical side walls each having a lower portion including a bottom and front and rear ends, and an upper portion extending upwardly from said lower portion and having an upper end, a plurality of rollers each having a roller axis transverse to said side walls, said rollers being mounted between said front ends of said side walls for supporting a pipe to be cut, arm means between said upper portions of said side walls and mounted thereon for pivotal displacement about a pivot axis transverse to said side walls, said arm means having a first end forwardly of said pivot axis and above said front ends of said side walls and a second end rearwardly of said pivot axis and above said rear ends of said side walls, a cutting wheel on said arm means adjacent said first end thereof and overlying said rollers, means including a drive shaft mounting said cutting wheel on said arm means for rotation about a wheel axis parallel to said pivot axis, said drive shaft including an input end extending axially outwardly of said arm means, drive motor means supported on said arm means for pivotal displacement therewith and having output means in driving interengagement with said input end of said drive shaft, hydraulic piston and cylinder means mounted between said rear ends of said side walls and said second end of said arm means for displacing said arm means about said pivot axis in the direction to displace said cutting wheel toward said rollers, and lever actuated variable displacement piston pump means for delivering hydraulic fluid under pressure to said piston and cylinder means to displace said arm means in said direction, said upper portions of said side walls having axially inner sides and said arm means being removably mounted on said upper portions and extending between said inner sides thereof, projection means on said inner sides of said upper portions and extending inwardly therefrom beneath the corresponding side of said arm means to vertically support said arm means during removal and replacement thereof, said arm means being selectively mountable on said upper portions of said side walls in one of a plurality of vertically spaced locations, and said projection means including projection means beneath said arm means in each of said locations.

32. A pipe cutting machine comprising spaced apart vertical side walls each having a lower portion including a bottom and front and rear ends and an upper portion extending upwardly from said lower portion and having an upper end, a plurality of rollers each having a roller axis transverse to said side walls, said rollers being mounted between said front ends of said side walls for supporting a pipe to be cut, arm means between said upper portion s of said side walls and mounted thereon for pivotal displacement about a pivot axis transverse to said side walls, said arm means having a first end forwardly of said pivot axis and above said front ends of said side walls and a second end rearwardly of said pivot axis and above said rear ends of said side walls, a cutting wheel on said arm means adjacent said first end thereof and overlying said rollers, means including a drive shaft mounting said cutting wheel on said arm means for rotation about a wheel axis parallel to said pivot axis, said drive shaft including an input end extending axially outwardly of said arm means, drive motor means supported on said arm means for pivotal displacement therewith and having output means in driving interengagement with said input end of said drive shaft, hydraulic piston and cylinder means mounted between said rear ends of said side walls and said second end of said arm means for displacing said arm means about said pivot axis in the direction to displace said cutting wheel toward said rollers, and levers actuated variable displacement piston pump means for delivering hydraulic fluid under pressure to said piston and cylinder means to displace said arm means in said direction; said drive motor means including a housing having opposite ends in the direction between said first and second ends of said arm means, said output means being at one of said ends and axially slidably receiving said input end of said drive shaft, housing support means on said arm means engaging with said housing between said opposite ends thereof to preclude rotation of said housing about said wheel axis, said piston and cylinder means being connected to said second end of said arm means by pin means, and said housing support means including a reaction arm mounted on said second end by said pin means and including a U-shaped portion opening axially outwardly to receive said housing.

33. A pipe cutting machine comprising spaced apart vertical side walls each having a lower portion including a bottom and front and rear ends and an upper portion extending upwardly from said lower portion and having an upper end, a plurality of rollers each having a roller axis transverse to said side walls, said rollers being mounted between said front ends of said side walls for supporting a pipe to be cut, arm means between said upper portions of said side walls and mounted thereon for pivotal displacement about a pivot axis transverse to said side walls, said arm means having a first end forwardly of said pivot axis and above said front ends of said side walls and a second end rearwardly of said pivot axis and above said rear ends of said side walls, a cutting wheel on said arm means adjacent said first end thereof and overlying said rollers, means including a drive shaft mounting said cutting wheel on said arm means for rotation about a wheel axis parallel to said pivot axis, said drive shaft including an input end extending axially outwardly of said arm means, drive motor means supported on said arm means for pivotal displacement therewith and having output means in driving interengagement with said input end of said drive shaft, hydraulic piston and cylinder means mounted between said rear ends of said side walls and said second end of said arm means for displacing said arm means about said pivot axis in the direction to displace said cutting wheel toward said rollers, and lever actuated variable displacement piston pump means for delivering hydraulic fluid under pressure to said piston and cylinder means to displace said arm means in said direction, said arm means including arm sides at said first ends spaced apart in the direction between said side walls, said cutting wheel being between said arm sides and having axially opposite sides facing said arm sides, means providing shaft receiving openings through said arm sides and through said opposite sides of said cutting wheel, said drive shaft being slidably received in said openings to mount said cutting wheel on said arm means, and guide means between said arm sides and said opposite sides of said cutting wheel for guiding said shaft receiving openings into alignment to receive said drive shaft during a cutting wheel mounting operation.

34. A pipe cutter according to claim 33, wherein said arm sides have upper ends and inner surfaces, and said guide means includes recesses in said inner surfaces extending downwardly from said upper ends and opening into said shaft receiving openings through said arm sides, and hub means on said opposite sides of said cutting wheel coaxial with said shaft receiving openings through said opposite sides, said hub means being vertically slidably received in said recess means.

* * * * *

UNITED STATES PATENT AND TRADEMARK OFFICE
CERTIFICATE OF CORRECTION

PATENT NO. : 5,261,301
DATED : November 16, 1993
INVENTOR(S) : Larry F. Babb and Michael P. Gallagher It is certified that error appears in the above-identified patent and that said Letters Patent is hereby corrected as shown below:

Column 2, line 41, change "moves" to -- move --.

Column 3, line 30 change "piston's" to -- piston and --.

Column 4, line 35 change "the" to -- a --; and line 47 delete "another".

Column 7, line 33 delete "a".

Column 10, line 16 change "upper most" to -- uppermost --; and line 55, change "b" to -- be --.

Column 16, line 45 delete "s"; line 64, change "levers" to -- lever --; and line 68 change ";" to -- , --.

Column 18, line 12 change "ends" to -- end --; and line 31 change "recess" to -- recesses --; and delete "means".

Signed and Sealed this

Twenty-fourth Day of September, 1996

Attest:

BRUCE LEHMAN

*Attesting Officer*    *Commissioner of Patents and Trademarks*